Dec. 24, 1968  C. C. GRANGER  3,417,558
TREE FRUIT HARVESTER
Filed July 22, 1966  3 Sheets-Sheet 1
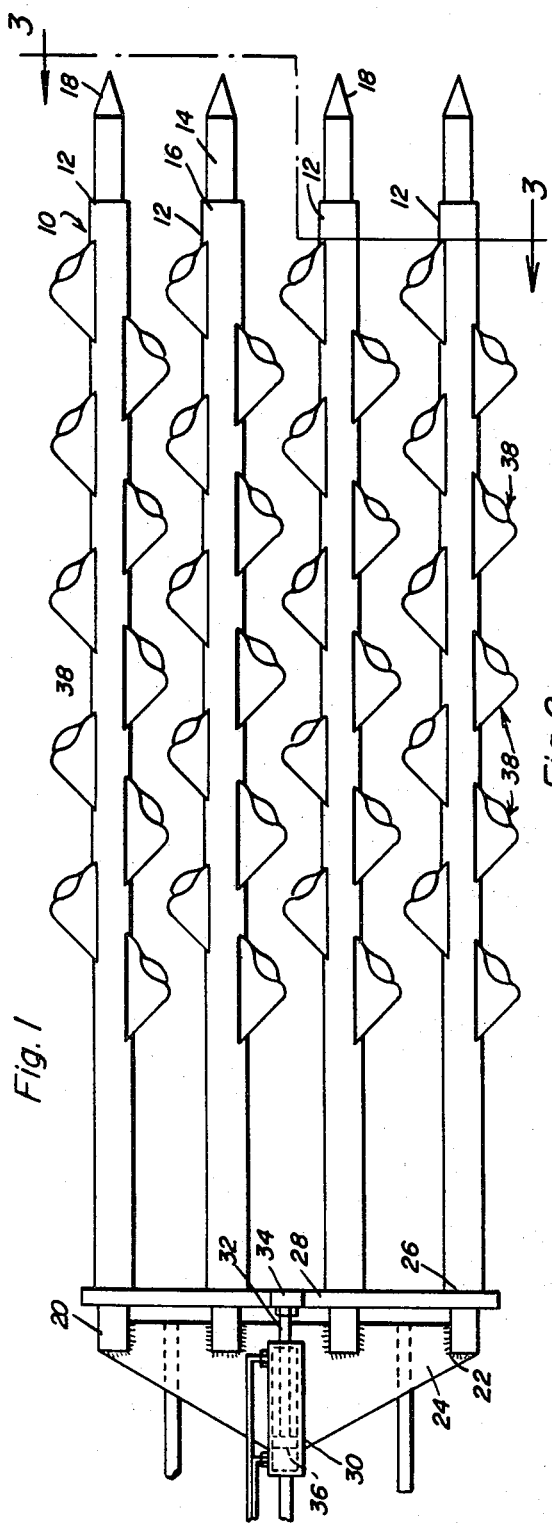
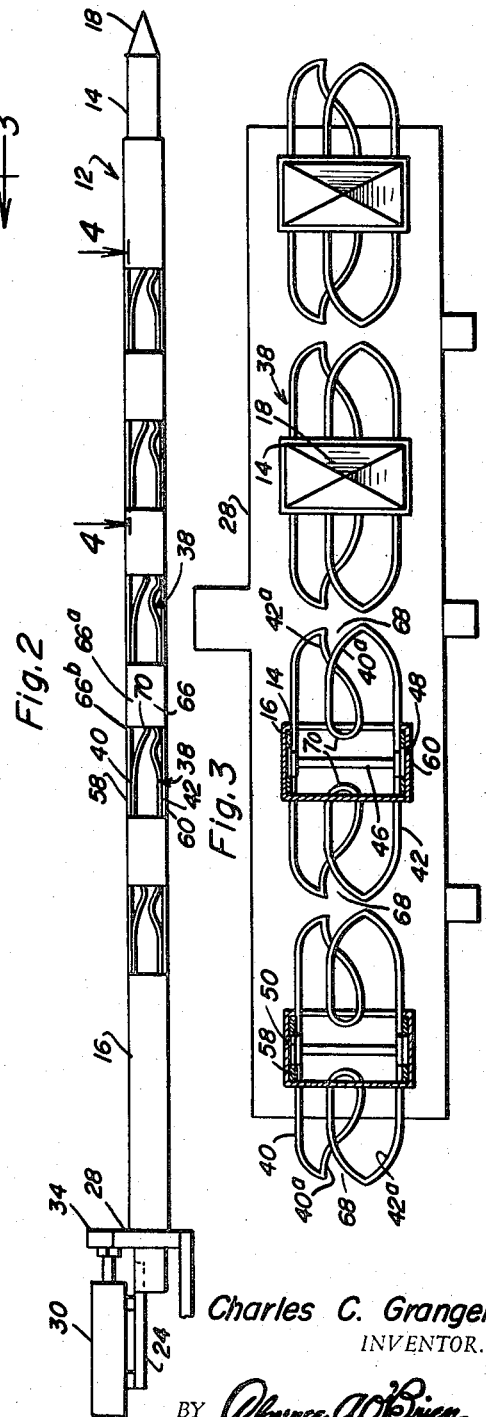
Charles C. Granger
INVENTOR.

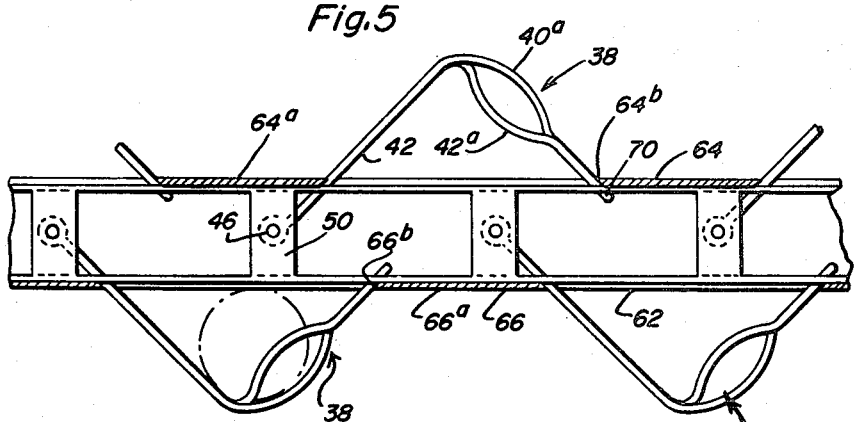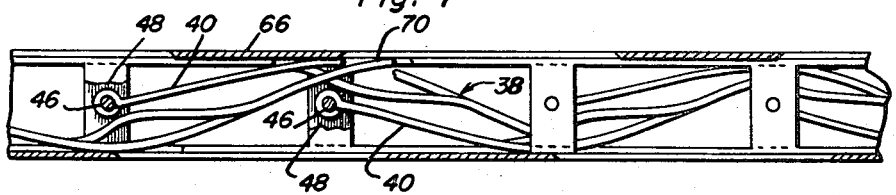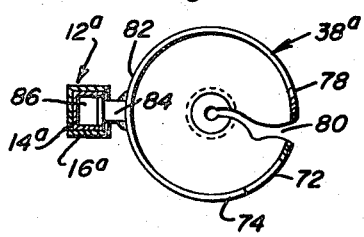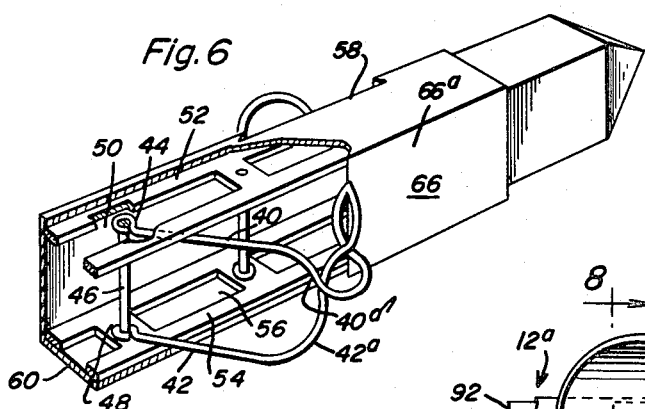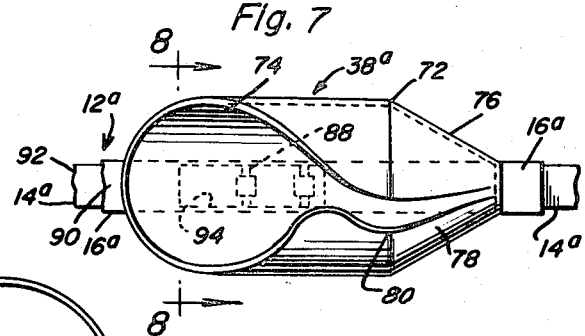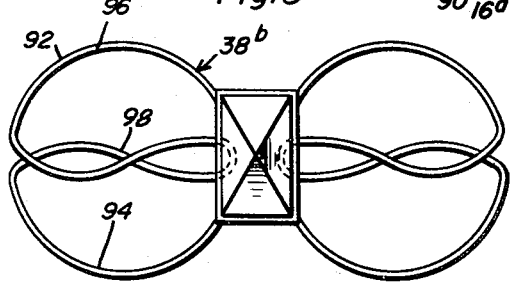

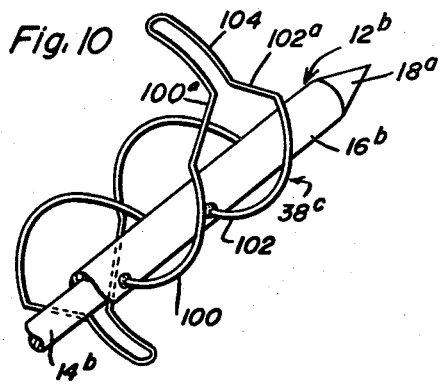
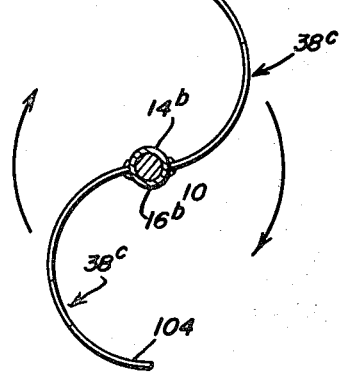
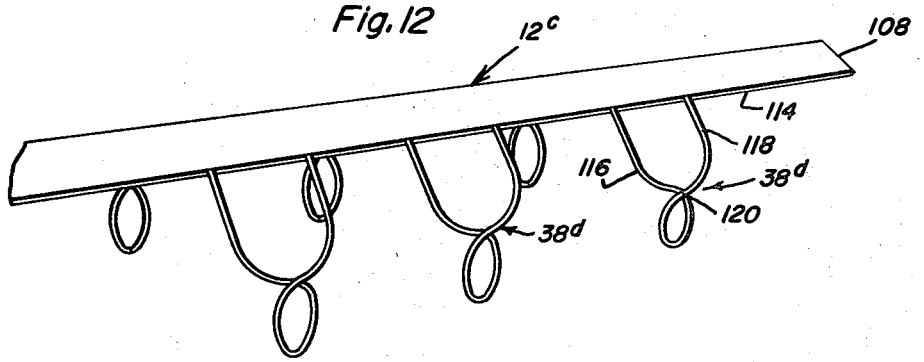
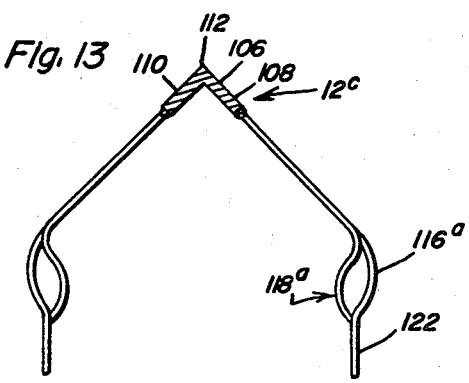

United States Patent Office 3,417,558
Patented Dec. 24, 1968

3,417,558
TREE FRUIT HARVESTER
Charles C. Granger, 1203 Chestnut St.,
Henderson, N.C. 27536
Filed July 22, 1966, Ser. No. 567,127
18 Claims. (Cl. 56—328)

This invention generally appertains to harvesters and more particularly relates to a harvesting unit for picking fruit and similar crops from trees. The present invention is especially directed to a novel tree fruit harvesting unit for picking of fruit, such as oranges, apples, grapefruit or the like, which are connected by stems to branches of a tree.

An important object of the present invention is to provide a fruit harvesting unit which is adapted to be bodily inserted radially into a tree between the branches supporting fruit connected thereto by stems and to harvest the fruit by separating the stems from the branches.

Another important object of the present invention is to provide a fruit harvesting unit which is operable, without any manual manipulation, to engage the stem supports for fruit and to twist off or break the stems from the branches and capture and captively retain and harvest the fruit, having its stems separated from the branches.

Another important object of the present invention is to provide a simple, compact and extremely effective fruit harvesting unit, which can be controlled from ground level and can be positioned at various heights for bodily insertion radially into a tree between the branches supporting fruit and which is formed so as to sever or disconnect the stems from the branches and captively engage and retain the fruit, which is free from the branches by virtue of its separated stems, such being effected without injury to the tree or to the fruit and in a very expeditious and economical manner.

Another important object of the present invention is to provide a fruit harvesting unit comprising at least one elongated supporting arm unit adapted to be bodily inserted radially into a tree between the branches supporting fruit connected thereto by stems with fruit capturing and separating members projecting laterally outwardly from the arm unit and the members having fruit capturing portions and means adjoining such fruit capturing portions for snaggingly engaging the stems joining the fruit to the branches and twisting off the stems so as to separate the fruit, which is captively engaged and held by the fruit capturing portions, the fruit capturing and separating members being operative upon movement of the arm supporting unit in its inserted position within the branches.

Another important object of the present invention is to provide a supporting arm unit which is bodily movable upwardly and to provide supporting arm units which are rotatable and which are reciprocable, relative to the long axis thereof, such movements causing the fruit capturing and separating members to be active in harvesting the fruit in a rapid and multiple manner, without injury to the fruit or to the tree branches.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one form of tree fruit harvesting unit, constructed in accordance with the present invention;

FIGURE 2 is a side elevational view of the harvester or harvesting unit, shown in FIGURE 1;

FIGURE 3 is a transverse sectional view, taken substantially on line 3—3 of FIGURE 1;

FIGURE 4 is an enlarged, detailed longitudinal sectional view, taken substantially on line 4—4 of FIGURE 2 and showing the fruit capturing and separating members in an inoperative position;

FIGURE 5 is a view similar to FIGURE 4, and showing the members in an outwardly projecting, operative position;

FIGURE 6 is a fragmentary, detailed perspective view of one of the arm units of the fruit harvester of FIGURE 1;

FIGURE 7 is a fragmentary side elevational view of a modified form of fruit harvester;

FIGURE 8 is a transverse sectional view taken substantially on line 8—8 of FIGURE 7;

FIGURE 9 is an end elevational view of a modified form of the construction shown in FIGURES 1–6;

FIGURE 10 is a perspective view of a further form of fruit harvester, constructed in accordance with the present invention;

FIGURE 11 is an end elevational view of the form of FIGURE 10;

FIGURE 12 is a perspective view of a further form of fruit harvester, constructed in accordance with the present invention; and, FIGURE 13 is a cross-sectional view of the form shown in FIGURE 12.

Referring now more particularly to the accompanying drawings and initially to FIGURES 1–6, the tree fruit harvester 10 comprises a plurality of parallel, laterally spaced elongated supporting arm units 12. The supporting arm units 12 are composed of an inner arm element 14 and an outer tubular arm element 16, which is in the nature of a sleeve that is disposed, in circumposed fashion, on the inner arm element 14, with the sleeve being slidable or reciprocal relative to the inner arm element 14. Thus, the inner and outer arm elements 14 and 16, which compose the supporting arm unit 12, are movable relative to each other in a reciprocatory fashion with respect to the longitudinal axis of the arm unit 12.

Each of the inner arm elements 14 terminates in an outer or forward pointed end or extremity 18 and an opposing rearward end 20, the ends 20 being secured, as by welding 22 or the like, to a common supporting plate 24. Thus, the arm units 12 are maintained in spaced apart, parallel relationship and are adapted to be moved inwardly, as a group, radially into a tree between the branches supporting fruit connected thereto by stems. The supporting plate 24 is positionable at various heights by a suitable power lift means (not shown) so that the supporting plate 24 disposes the arm units 12 in a common horizontal plane for common bodily movement into the branches of a tree, the pointed outer ends or extremities 18 aiding in the bodily movement of the units radially into the tree between the branches.

Each of the outer arm elements or sleeves 16 is slidably disposed on the inner arm element 14 and the rearward ends 26 of the tubular outer arm elements or sleeves 16 are connected together by a cross-brace means 28.

Means is provided for effecting a simultaneous and common reciprocal to-and-fro movement of the sleeves or outer arm elements 16, relative to their respective inner arm elements 14. Such means includes a double-acting hydraulic ram or cylinder 30, which is supported on the supporting plate 24 and which has a piston rod 32 having its outer end attached to the transverse brace bar 28 by a suitable structural connection 34. The flow of pressure fluid in the conduits on opposite sides of the piston 36 for the piston rod 32, the piston being workingly mounted in the cylinder, is controlled by suitable valve means (not shown) from a ground level, where the control means for raising and lowering the harvester and for moving the arm units 12 of the harvester radially inwardly and outwardly with respect to the branches of the tree are disposed.

Each of the outer arm elements or sleeves 16 is of non-circular tubular cross-sectional configuration, with the inner arm elements 14 being of complementary, cross-sectional configuration, so that relative rotational movement between the inner and outer arm elements, 14 and 16, of each supporting arm unit 12 is prevented and the arm elements 14 and 16 are solely capable of relative reciprocal movement along the longitudinal axis of each of the supporting arm units.

Each of the arm supporting units 12 is provided with fruit capturing and separating members 38, which project laterally therefrom in and are spaced apart along the long axis of each arm unit, the fruit capturing and separating members 38 laterally projecting outwardly from opposing sides of each arm unit 12 and being arranged, in such oppositely extending, longitudinally spaced orientation on the arm supporting unit, in staggered, interposed relationship, as shown in FIGURE 1.

As shown more clearly in FIGURES 4–6, each of the fruit capturing and separating members 38 is formed from a single piece of heavy-duty wire or similar, wire-like resilient material and is composed of inner, parallel and laterally spaced, opposing straight leg portions 40 and 42. The inner ends of the leg portions 40 and 42 terminate in eyelets 44, which are pivotally circumposed on pins 46 that are anchored, at their opposing ends in portions 48 and 50 of the opposing top and bottom side walls 52 and 54 of the inner arm element 14. The portions 48 are spaced apart and separated by virtue of elongated, longitudinal openings 56 formed in the walls, as shown in FIGURE 6.

It is to be noted that the confronting top and bottom walls 58 and 60 of the outer arm element or tubular sleeve 16 are spaced from the outer surfaces of the sides 52 and 54 of the inner arm element 14, so that a spacing is provided for the mounting of the arm portions 40 and 42 and for their swinging movement, intermediate the confronting top and bottom walls of the inner and outer arm elements 14 and 16.

The members 38 are adapted to project laterally outwardly from the inner arm element 14 through apertures or openings 62 formed in the opposing side walls 64 and 66 of the outer arm element or tubular sleeve 16, as shown in FIGURE 5, with the apertures 62 being spaced apart by means of side wall sections 64a and 66a.

The other end portions 40a and 42a of the leg portions 40 and 42 of each member 38, are bent inwardly and crossed over themselves in curved shape, as shown in FIGURE 3, so as to define therebetween a notch 68, which defines a means adjoining the fruit capturing and separating portion, constituted by the leg portions 40 and 42, for snaggingly engaging the stem joining the fruit to a branch and twisting the stem to snap it off its tree branch. The portions 40a and 42a are crossed over and are curved inwardly and outwardly and terminate in a closed flat loop 70, which constitutes the outer, free extremity of the member 38. The end 70 is adapted to engage the tranverse bounding edge 66b of the connecting wall portion 66a, in the instance of the members 38 that project from one side and the end 70 is adapted to engage the bounding edge 64b of the other side, in the instance of the member that projects from the opposite side of the supporting arm unit as shown in FIGURE 5. Thus, the loop end portion 70 of each member 38 serves to interconnect the end portions 40a and 42a and serves to prevent the members from swinging entirely out beyond the sides 64 and 66 of the outer arm element or tubular sleeve 16 and serves to position the members in laterally orientated relationship, with respect to the associated supporting arm unit for proper use of each supporting arm unit 12 of the fruit harvester or harvesting unit 10.

A supporting arm unit 12 or a group of structurally and functionally associated supporting arm units 12, as shown in FIGURE 1, have their inner and outer arm elements 14 and 16 in the position, as shown in FIGURES 2 and 4, with respect to the members 38, when the supporting arm units are moved bodily radially into the branches of a tree. The pointed extremities 18 permit the supporting arm units to be easily moved into the tree between the branches, with the members 38 being in a closed or inoperative position, that is, held in an enclosed relationship by and with the outer arm element or tubular sleeve 16. Therefore, the supporting arm units have no outstanding obstructions, which would offer any impediment to the easy and quick movement of the supporting arm units or one unit into position within the branches of a tree.

When the supporting arm units are properly positioned within the branches of a tree, then the actuating means 30 is rendered operative, so as to move the outer arm elements or tubular sleeves forwardly with respect to the fixed inner arm elements 14, whereupon the apertures or openings 62 in the side walls 64 and 66 of each outer element or sleeve expose the members 38. The members 38, which are formed from the inherently resilient material, such as resilient wire, are free to swing outwardly about their pivots so as to assume laterally, outwardly projecting positions, as shown in FIGURES 1 and 5.

The supporting arm units are then bodily withdrawn from their inserted positions within the tree branches and, in the process of such bodily withdrawal of each supporting arm unit, the fruit capturing portion engages a fruit, as shown in FIGURE 5, while the stem of the fruit is engaged by the notch 68 and the stem is twisted off from the branch, without injury to the branch or without damaging the captive fruit. The fruit are held by the fruit capturing portions of each member 38 and, when the supporting arm units are bodily moved away from the branches, the fruit are then disposed so as to be easily removed and deposited in suitable receptacle means by any suitable arrangement (not shown).

It can be appreciated that the members 38 are inherently resilient and are held in closed positions by virtue of the overlying tubular sleeve or outer arm element 16, as shown in FIGURE 4, so that when the sleeve 16 is moved relative to its associated, fixed inner arm element 14, the members 38 automatically project outwardly into the lateral projecting positions, as shown in FIGURE 5.

While a plurality of supporting arm units 12 have been illustrated in FIGURE 1, it is obvious that only or at least one supporting unit can be provided and that the same can be constructed, as shown in FIGURES 5 and 6, or, the members 38 can project from only one side of the supporting arm unit, instead of projecting laterally from opposing sides, as shown in FIGURES 5 and 6.

With reference to FIGURES 7 and 8, the supporting arm unit 12a comprises an inner arm element 14a and an outer arm element 16a, which are in relative, reciprocating relation, similar to the relative axial reciprocal movement of the arm elements 14 and 16 of the arm supporting unit 12.

The fruit capturing and separating member 38a of the form of FIGURES 7 and 8 comprises a funnel-shaped member 72, having an open major end 74, which faces rearwardly and having a closed conical-shaped opposing, forward end portion 76. The outer side wall 78 is formed with an axial slot 80, which is curved downwardly and tapered inwardly and rearwardly from its opened end in communication with the edge of the major open end 74. The opposing or inner side wall 82 of the member 72 is provided with lateral arms 84, which carry brackets 86 that are disposed on rods 88 provided between the top and bottom wall of the fixed inner arm element 14a. The side wall 90 of the outer movable arm element 16a and the side wall 92 of the inner arm element are provided with confronting slots 94, whereby the slidable outer arm element or tubular sleeve 16a can move the funnel-shaped member 72 rearwardly, after the supporting arm unit 12a has been interposed within the branches. A piece of fruit will be engaged, in a captive manner, by the open major end or mouth 74 of the funnel-shaped member 72 and the stem will be engaged by the slot 80 and, due to the configuration of the slot, upon the straight rearward movement of the member 72, the stem will be twisted, as in the case of the twisting action of the notch 68, so that the stem is twisted and broken off from the branch to free the article of fruit for retention by the fruit capturing portion.

FIGURE 9 shows a modified form of the fruit capturing and separating members 38 of FIGURES 1–6. In FIGURE 9, the fruit capturing and separating member 38b is formed from a single piece of resilient wire or the like component 92, which is bent upon itself so as to form upper and lower fruit capturing portions 94 and 96, which are semicircular and are joined together by reversely looped portions 98 that define the means for engaging the fruit stem and twisting the stem so as to break the stem off the carrying branch upon the reciprocating movement of the member 38a.

In FIGURES 10 and 11, a further modified form of supporting arm unit 12b is illustrated, the same including an inner fixed arm element 14b and an outer arm element or tubular sleeve 16b. The inner arm element 14b terminates in an outer pointed end or extremity 18b. The outer arm element 16b, which is in the form of a tubular sleeve, is disposed on the inner arm element 14b for bodily rotative movement about the long axis of the supporting arm unit 12b.

Therefore, instead of the reciprocatory movement, along the longitudinal axis of the supporting arm units, as disclosed in connection with the embodiments, thus far described, the supporting arm unit 12b has its outer arm element 16b rotatable relative to the inner arm element 14b.

The fruit capturing and supporting members 38c are formed on the outer arm element or sleeve 16b and project therefrom in opposing directions and are curved upon themselves, so that they are substantially semicircular or arcuate in end elevation, as shown in FIG. 11. Each member 38c comprises a pair of arcuate leg portions 100 and 102, which are spaced apart and disposed in parallel relation and have their inner ends suitably anchored to the outer member or tubular sleeve 16a. The outer end portions 100a and 102a of the legs 100 and 102 are curved on the same radius as the legs and are inclined inwardly and connected together by a curved connecting loop end 104, which is in the form of a closed loop and is formed on the same radius as the arms 100 and 102. The member 38c is formed from a single length or section of resilient wire or similar material and the legs 100 and 102 define the fruit capturing portion, with the outer inclined end portions 100a and 102a, in conjunction with the joining loop 104 forming the means for engaging the stem and twisting the stem to break it from the branch so as to dislodge the captive fruit from the branch.

As shown in FIGURE 11, the outer arm element or tubular sleeve 16b is rotated in a clockwise direction about the stationary inner arm element 14a, when the supporting arm unit 12b is bodily positioned radially within the branches of a tree.

In FIGURES 12 and 13, a further form of supporting arm unit 12c is shown. The supporting arm unit 12c comprises an elongated bar member 106, which has outwardly and downwardly sloped and angularly related side sections 108 and 110. The outer juncture point between the side sections of the bar forms an angular point 112. The sides 108 and 110 have free side edges 114 to which fruit capturing and separating members 38d are attached.

As shown in FIGURES 12 and 13, each member 38d is formed from a single length of resilient wire or other similar, resilient thin material, and is composed of a pair of legs 116 and 118. The legs 116 and 118 have their inner ends suitably connected to the edges 114 of the sides 108 and 110 and extend outwardly therefrom in substantial coplanar relationship therewith. The legs 116 and 118 are spaced apart in parallelism to define or constitute the fruit capturing portion. The outer ends of the legs are bent upon themselves to form a notch means 120 and the outer ends 116a and 118a are crossed and bent or curved outwardly, in such crossed relationship, as shown in FIGURE 13, and are offset angularly so as to depend vertically from the legs 116 and 118. The leg portions 116a and 118a terminate in a closed connecting loop 122, that is perpendicularly orientated with respect to the outwardly and downwardly sloping sides 108 and 110.

The supporting arm unit 12c is adapted to be bodily moved upwardly, starting at the bottom of the tree and going to the top portion thereof, with the supporting arm unit 12c inserted radially within the branches of the tree. The sloping sides 108 and 110 brush the branches apart and cause the fruit to be knocked back and forth into each other with the fruit being captured by the capturing portion defined by the legs 116 and 118 and the stems being caught by the notch 120 and given a twisting action, so as to twist the stem from its associated branch.

Of course, any number of supporting arm units 12c may be carried, in coplanar parallel relationship, as in the case of the supporting arm units 12 of FIGURE 1, by a common supporting means, which is mechanically actuated so that the supporting units 12c are moved radially into the branches at lower end of the tree and then mechanically moved upwardly through the branches to the top portion of the tree and then mechanically withdrawn and lowered so as to remove the captured fruit.

In the instance of the form of FIGURES 10 and 11, it also is to be understood that a number of supporting arm units 12b would be supported by a common supporting means for moving the arm units radially inwardly into the branches of the tree and mechanical means being provided for commonly rotating the outer arm elements or tubular sleeves 16b.

It can be appreciated that, with respect to all of the embodiments, the supporting arm units are adapted to be bodily inserted radially into a tree between the branches supporting fruit connected to the branches by stems and that the supporting arm units have fruit capturing and separating members projecting laterally outwardly therefrom and spaced apart along the longitudinal axis of each arm unit and that the members include a fruit capturing portion and means adjoining such portion for snaggingly engaging the stems and twisting the stems to break the stem off from the branches. Thus, an important feature of construction and operation, which is common to all of the illustrated and described embodiments, is that they are provided with means which functions to engage and twist the fruit supporting or connecting stems so as to break the stems, in a quicker and easier manner, thereby dislodging the fruit from the branches, without damage to the fruit or the branches.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree fruit harvesting unit comprising at least one elongated supporting arm unit adapted to be bodily inserted radially into a tree between the branches supporting fruit connected thereto by stems, fruit capturing and separating members projecting laterally outwardly from the arm unit and spaced apart along the longitudinal axis of said arm unit, each of said members having a fruit capturing portion and means adjoining such portion for snaggingly engaging the stem joining the fruit to a branch and twisting the stem to break it off from the branch, said supporting arm unit being movable in its inserted position within the branches for causing fruit to be captively engaged by the capturing portion of each member with the associated supporting stems for the fruit engaged by the adjoining stem engaging means and being twisted off the carrying branch under the movement of the supporting arm unit so that the freed fruit is captively received and retained by the fruit capturing portion of each member.

2. The invention of claim 1, wherein said supporting arm unit comprises an elongated arm of angular cross-section composed of angularly related longitudinal side sections having joined upper side edges and free outwardly disposed lower side edges, said members extending outwardly and downwardly from the lower side edges of each side section and the arm being movable bodily upwardly with the joined upper side edges constituting means for knocking branches apart and knocking fruit on the branches back and forth into each other thereby rendering it easier for the fruit and its supporting stems to be engaged by said members with the stems being engaged by said stem engaging means and being twisted off from the branches as the arm is moved bodily upwardly.

3. The invention of claim 1, wherein said supporting arm unit includes inner and outer relatively movable and cooperating arm elements, said members being carried by one of said elements and said elements being movable relative to each other with respect to the longitudinal axis of the supporting unit which is maintained in a position inserted within the branches upon each harvesting operation.

4. The invention of claim 3, wherein said arm elements are relatively rotatable about the longitudinal axis of the arm unit.

5. The invention of claim 3, wherein said arm elements are relatively reciprocable along the longitudinal axis of the arm unit.

6. The invention of claim 3, wherein said arm elements are relatively rotatable about the longitudinal axis of the arm unit and said members are carried by the outer arm element.

7. The invention of claim 3, wherein said arm elements are relatively rotatable about the longitudinal axis of the arm unit and said members are carried by the outer arm element, said members extending in radially opposite directions from the outer arm element and being arcuate.

8. The invention of claim 3, wherein said arm elements are relatively rotatable about the longitudinal axis of the arm unit and said members are carried by the outer arm element, said members extending in radially opposite directions from the outer arm element and being arcuate and said outer arm element being rotated on the inner arm element which is stationary.

9. The invention of claim 6, wherein each of said members is curved and formed from resilient wire having legs provided with ends attached in spaced relation to the outer arm element, said legs having curved inner end portions spaced apart to define the fruit capturing portion, said legs having closely disposed slightly spaced outer end portions curved on the same radius as the inner end portions and joined together with the outer end portions defining a slot to engage the stem as the fruit is caught by the inner end portions of the legs and twist the stem to break it off its associated branch.

10. The invention of claim 3, wherein said arm elements are relatively reciprocable along the longitudinal axis of the arm unit, said members being carried by the inner arm element, means preventing relative rotational movements between said arm elements.

11. The invention of claim 10, wherein said members have funnel-shaped bodies having open ends constituting the fruit capturing portion with the fruit entering the open ends and said stem engaging means being constituted by a slot formed axially in the side wall of each body and extending through the open ends.

12. The invention of claim 1, wherein said arm unit includes inner and outer relatively reciprocating arm elements, means preventing relative rotational movements between said arm elements, said members being carried by the inner arm element, said outer arm element constituting a sleeve movable axially on the inner arm element, said sleeve having spaced openings and means mounting said members for positioning outwardly projecting from the inner member and the sleeve when the openings are positioned to expose the members for such movement, said sleeve having solid wall portions intermediate the openings to hold the members in closed positions.

13. The invention of claim 12, said members being pivotally mounted on the inner member, means pivotally mounting each of the members on the inner arm element at one end of said member so that the fruit capturing portion is adapted to project outwardly from the pivotal mounting when the opening in the sleeve exposes said member, said stem engaging means being angularly inclined from the fruit capturing portion and said member having a free end engaged by a bounding edge of an opening when the member is in an outwardly projecting position.

14. The invention of claim 13, wherein said member is formed of resilient wire shaped to define the fruit capturing portion and stem engaging means including a notch-like portion defined by the shaped wire and which is adapted to engage and twist a stem off a branch so as to separate the fruit from the branch.

15. The invention of claim 13, and including actuating means for sliding the sleeve axially to and fro on the inner arm element so as to move the sleeve, after the arm unit has been bodily inserted into the branches, with the sleeve disposed relative to the inner arm element so that the solid wall portions overlie the members and retain them in closed inoperative positions, axially relative to the inner arm element so as to dispose the openings in exposure relation to the members whereby the members then project outwardly from the inner arm element through the openings and are disposed laterally of the sleeve.

16. The invention of claim 15, wherein a plurality of said arm units are provided and are disposed in parallel, spaced relationship.

17. The invention of claim 16, wherein said inner arm elements have outer pointed ends and inner ends and a common support means attached to said inner ends for fixedly retaining them in such orientated relation.

18. The invention of claim 17, wherein means interconnects said sleeves and said actuating means includes a fluid cylinder and piston arrangement connected to said sleeve inter-connecting means.

References Cited
UNITED STATES PATENTS

| | | | |
|---|---|---|---|
| 2,748,555 | 6/1956 | Le Cocq | 56—338 |
| 3,127,725 | 4/1964 | Richardson | 56—328 |
| 3,129,551 | 4/1964 | Lasswell | 56—328 |

RUSSELL R. KINSEY, *Primary Examiner.*